(12) United States Patent
Ueyama

(10) Patent No.: US 10,139,955 B2
(45) Date of Patent: Nov. 27, 2018

(54) DISPLAY UNIT FOR VEHICLE AND DISPLAY CONTROL UNIT

(71) Applicant: DENSO CORPORATION, Kariya, Aichi-pref. (JP)

(72) Inventor: Kengo Ueyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 69 days.

(21) Appl. No.: 15/512,102

(22) PCT Filed: Oct. 12, 2015

(86) PCT No.: PCT/JP2015/005159
§ 371 (c)(1),
(2) Date: Mar. 17, 2017

(87) PCT Pub. No.: WO2016/063487
PCT Pub. Date: Apr. 28, 2016

(65) Prior Publication Data
US 2018/0253178 A1    Sep. 6, 2018

(30) Foreign Application Priority Data
Oct. 23, 2014  (JP) .................................. 2014-216435

(51) Int. Cl.
*G06F 3/041*    (2006.01)
*G02F 1/1333*    (2006.01)
*G06F 3/0488*    (2013.01)

(52) U.S. Cl.
CPC ........ *G06F 3/0416* (2013.01); *G02F 1/13338* (2013.01); *G06F 3/0412* (2013.01); *G06F 3/0488* (2013.01); *B60K 2350/1028* (2013.01)

(58) Field of Classification Search
CPC .... G06F 3/0416; G06F 3/0412; G06F 3/0488; G02F 1/13338; B60K 2350/1028
See application file for complete search history.

(56) References Cited

U.S. PATENT DOCUMENTS

| | | | | |
|---|---|---|---|---|
| 7,937,667 | B2* | 5/2011 | Kramer ................. | B60K 35/00 715/781 |
| 2008/0077882 | A1* | 3/2008 | Kramer ................. | B60K 35/00 715/810 |
| 2012/0268665 | A1* | 10/2012 | Yetukuri ................ | B60K 35/00 348/837 |
| 2017/0228031 | A1* | 8/2017 | Kramer ................. | B60K 35/00 |
| 2017/0315407 | A1* | 11/2017 | Ai .................... | G02F 1/133308 |

FOREIGN PATENT DOCUMENTS

JP        2008149983 A     7/2008

* cited by examiner

*Primary Examiner* — Peter D McLoone
(74) *Attorney, Agent, or Firm* — Harness, Dickey & Pierce, P.L.C.

(57) ABSTRACT

A display unit for a vehicle includes: a display; a touch panel; a substrate mounting a main CPU that generates image data, a sub CPU that controls electric power supply, a display controller, and multiple external connectors for one external device; a plate that supports the substrate; and a housing that accommodates the display, the plate, and the substrate. The plate is arranged to face the display. The substrate is arranged on an opposite side to the display to face the plate. The plate has a base. The substrate includes a touch panel connector for a touch panel controller arranged on the base.

10 Claims, 4 Drawing Sheets

DISPLAY UNIT FOR VEHICLE AND DISPLAY CONTROL UNIT

CROSS REFERENCE TO RELATED APPLICATIONS

This application is a U.S. National Phase Application under 35 U.S.C. 371 of International Application No. PCT/JP2015/005159 filed on Oct. 12, 2015 and published in Japanese as WO 2016/063487 A1 on Apr. 28, 2016. This application is based on and claims the benefit of priority from Japanese Patent Application No. 2014-216435 filed on Oct. 23, 2014. The entire disclosures all of the above applications are incorporated herein by reference.

TECHNICAL FIELD

The present disclosure relates to a display unit for vehicle, and a display control unit to control contents displayed on a display used in a vehicle.

BACKGROUND ART

Conventionally, as disclosed in Patent Literature 1, an on-board electronic device having CPUs and substrates, respectively corresponding to types of functions, such as a navigation board on which a CPU to perform navigation processing is mounted and an audio board on which a CPU to perform audio processing is mounted, is known. Note that this type of on-board electronic device is often integrated with a display and a touch panel.

Further, in recent years, in accordance with multimediazation in the vehicle, a configuration, where a user interface unit (UI unit) having integrated display and touch panel is connected to a plurality of electronic devices mounted on the vehicle such as a navigational device and an audio instrument, via a display control unit (hereinbelow, DCU), is increasingly adopted. The DCU plays a role in control of the respective operations of the plurality of electronic devices connected to the own device, and generation (or acquisition) of image data to be displayed on the display based on requests from the respective electronic devices, and display of the image data on the display. Hereinbelow, a unit where the UI unit and the DCU are integrated will be referred to as a display unit for vehicle.

A conventional DCU has two substrates, i.e., a main board mounted with a main CPU and a sub board mounted with a sub CPU and a power supply circuit. The main CPU mainly controls the operations of the electronic devices connected to the own device, and draws an image to be outputted to the display. The sub CPU performs management (acquisition and storage) of vehicle information inputted from an in-vehicle network, and controls electric power supply to the respective elements of the display unit for vehicle in cooperation with the power supply circuit.

The conventional DCU has two substrates, i.e. the main board and the sub board, mainly for reducing the area of each substrate to an area smaller than that of the display.

More particularly, to realize a function, performed with a main board and a sub board, using one substrate, the area of the substrate is larger than the area of the display. When the area of the substrate is larger than the area of the display, its housing is also larger than the display, to impair mountability to the vehicle.

Accordingly, in the conventional DCU, a function to be provided in the DCU is shared with the two substrates, the main board and the sub board, so that the size of each substrate is suppressed to be equal to or smaller than the size of the display.

However, in the conventional display unit for vehicle (more particularly, DCU) having two substrates, the manufacturing cost such as costs of parts and machining cost is increased. The machining cost here includes costs necessary for assembling work of the respective substrates in the housing and wiring connection work between the substrates.

Further, it is desired to increase the CPU clock for improvement in DCU performance. However, in the conventional DCU, the space in the housing is partitioned with the two substrates. When the clock is increased, radiation with a cooling fan becomes insufficient. Accordingly, from the viewpoints of manufacturing cost and heat dissipation, it is preferable that the number of the substrates is one.

On the other hand, as described above, when a function realized with two substrates is simply integrated in one substrate, the area of the substrate becomes larger than the area of the display, which might impair the mountability. Especially, when the difference between the area of the display and the area of the substrate is large, i.e., when the area of the substrate is larger, the mountability is impaired.

PRIOR ART LITERATURES

Patent Literature

Patent Literature 1: JP-2008-149983-A

SUMMARY OF INVENTION

It is an object of the present disclosure to provide a display unit for vehicle having one substrate, and a display control unit, to suppress the excess amount of the area of the substrate with respect to the area of the display.

According to a first aspect of the present disclosure, a display unit for a vehicle includes: a display having a display surface with a rectangular shape; a touch panel stacked on the display surface; a substrate with a rectangular shape, on which a main CPU that generates image data to be displayed on the display, a sub CPU that controls electric power supply in the display unit, a display controller that performs a drive control on the display based on the image data, and a plurality of external connectors used for electrical connection to at least one external device arranged outside the display unit, are mounted; a plate that is a conductive plate member, and supports the substrate; and a housing that accommodates the display, the plate, and the substrate so as to expose the display surface of the display. The display unit for the vehicle is mutually and communicably connected to the at least one external device and controls a content to be displayed on the display based on a request from the at least one external device. The plate is arranged on an opposite side to the display surface so as to face the display. The substrate is arranged on an opposite side to the display with respect to the plate so as to face the plate. The plate has a base extending to a direction of the substrate with a predetermined angle and disposed on an edge of the plate. A touch panel controller for controlling a drive of the touch panel is arranged on the base. The substrate further includes a touch panel connector used for electrical connection between the touch panel controller and the substrate.

With the above configuration, the touch panel controller is provided, not on the substrate, but on a base section provided in a plate. The touch panel controller provided on the base section is electrically connected via a touch panel connector to the substrate.

According to the above configuration, since the touch panel controller is not provided on the substrate, it is possible to reduce the area for the touch panel controller on the substrate. Even when the substrate is larger than the display, it is possible to suppress the excess amount of the area of the substrate with respect to the area of the display.

According to a second aspect of the present disclosure, a display control unit is connected to a user interface unit which includes: a display having a display surface with a rectangular shape; and a touch panel stacked on the display surface, and further is mutually and communicably connected to at least one external device which is disposed outside the display control unit, and controls a content to be displayed on the display based on a request from the at least one external device. The display control unit includes: a substrate with a rectangular shape, on which a main CPU that generates image data to be displayed on the display, a sub CPU that controls an electric power supply status in the display control unit, a display controller that performs a drive control on the display based on the image data, and a plurality of external connectors used for electrical connection to at least one external, are mounted; and a plate that is a conductive plate member, and supports the substrate. The substrate is arranged to face the plate with a predetermined distance. The plate has a base extending to a direction toward the substrate with a predetermined angle, and disposed on an edge of the plate. A touch panel controller for controlling a drive of the touch panel is arranged on the base. The substrate further includes a touch panel connector used for electrical connecting between the touch panel controller and the substrate.

The display control unit is integrated with the user interface unit, thus becomes the above display unit for vehicle. That is, according to the above configuration, it is possible to attain the same advantage as that attained with the display unit for vehicle in the first aspect.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
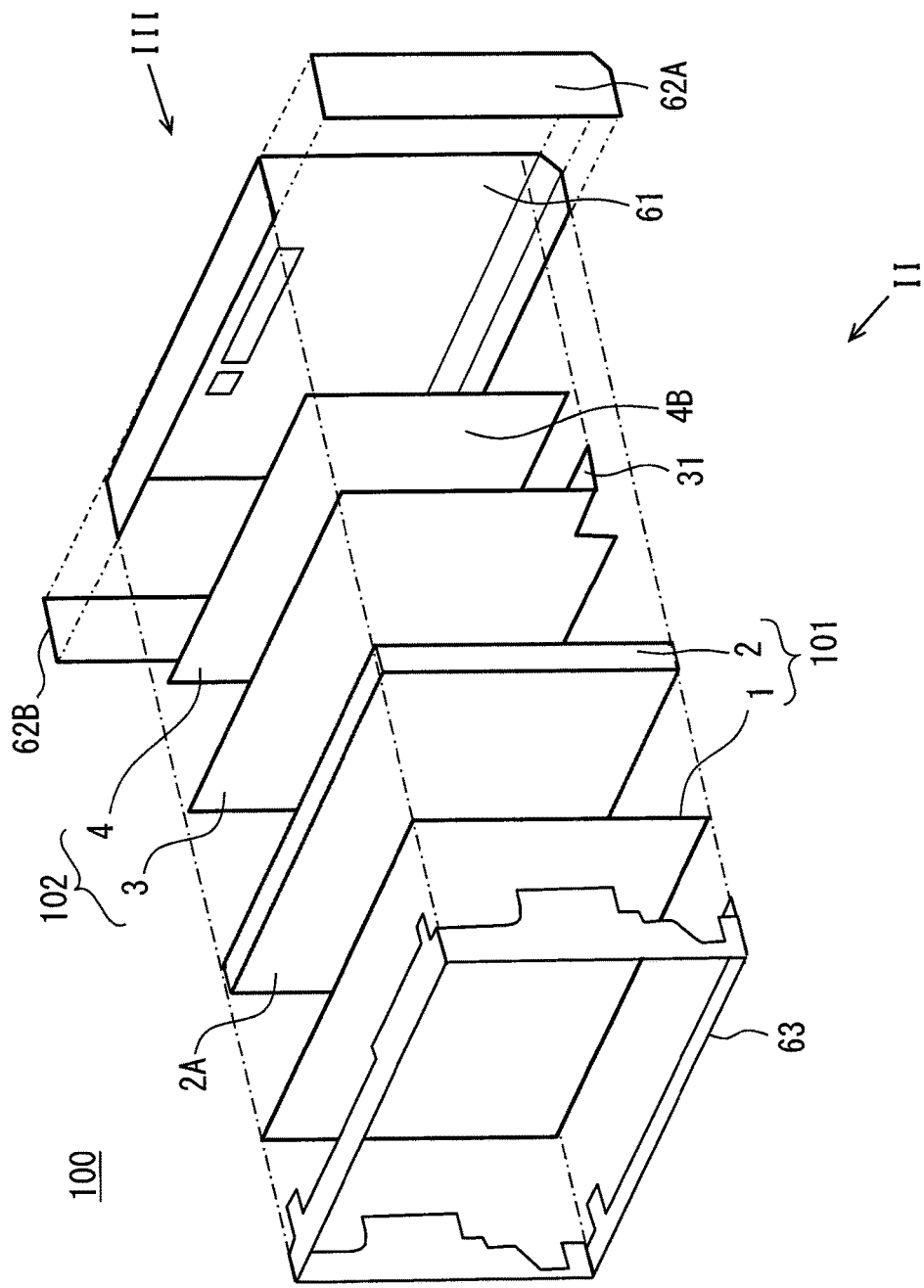
FIG. 1 is an exploded perspective view of a display unit for vehicle.
Figure 2:
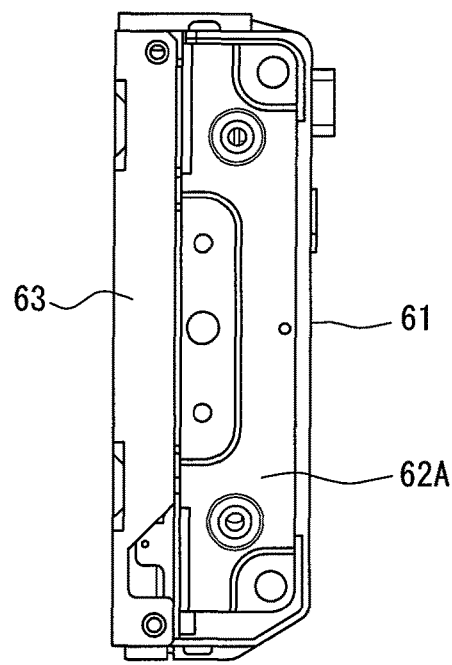
FIG. 2 is a side view of the display unit for vehicle.
Figure 3:
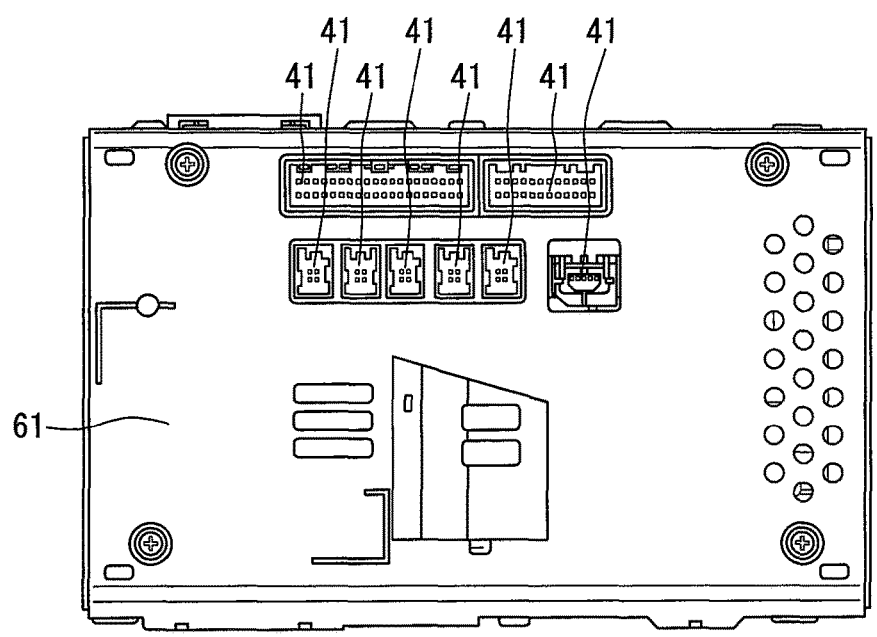
FIG. 3 is a rear view of the display unit for vehicle.

Hereinbelow, an embodiment of the present disclosure will be described using the drawings. FIG. 1 is an exploded perspective view for explaining a schematic configuration of a display unit for vehicle 100 according to the present disclosure. FIG. 2 is a side view of the display unit for vehicle 100 in an assembled status shown in FIG. 1 viewed from an arrow II direction. FIG. 3 is a rear view of the assembled display unit for vehicle 100 viewed from an arrow III direction.

The display unit for vehicle 100 is mutually communicably connected to various electronic devices mounted on a vehicle, such as a navigational device, an audio instrument, and air-conditioning equipment, via vehicle connectors 41 shown in FIG. 3. The display unit for vehicle 100 outputs a control signal corresponding to an operation input from a user to an electronic device corresponding to the user operation, and displays images in correspondence with requests from the respective electronic devices.

Further, the display unit for vehicle 100 is connected to a vehicle power source, an ECU to handle vehicle information (e.g. vehicle speed), and a display provided outside the display unit for vehicle 100 (external display), via the vehicle connectors 41. Hereinafter, the devices connected to the display unit for vehicle 100 will be generally referred to as connected devices. The various electronic devices, the vehicle power source, the ECU, and the external display are examples of the external devices. Hereinbelow, the configuration of the display unit for vehicle 100 will be more specifically described.

As shown in FIG. 1, the display unit for vehicle 100 has a touch panel 1, an LCD (Liquid Crystal Display) module 2, a plate 3, and a substrate 4. The touch panel 1, the LCD module 2, the plate 3, and the substrate 4 are accommodated in a housing having a conductive housing rear surface 61, housing side surfaces 62A and 62B, and a frame 63. Note that the touch panel 1, the LCD module 2, the plate 3, and the substrate 4 are supported in mutually opposed posture in the housing.

In the display unit for vehicle 100, the touch panel 1 functions as interface for the user to issue instructions to the respective electronic devices connected to the display unit for vehicle 100. Further, the LCD module 2 functions as one of the interface to present various types of information to the user. That is, the touch panel 1 and the LCD module 2 function as a user interface unit (hereinafter, UI unit) 101 to perform information transmission/reception to/from the user.

Further, the plate 3 and the substrate 4 to be described below function as a display control unit (hereinafter, DCU) 102 to control the respective connected devices based on operations accepted with the touch panel 1, and control the contents to be displayed on a display (LCD module 2 here) based on requests from the respective connected devices.

The display unit for vehicle 100 is installed in a predetermined position of the vehicle such that the touch panel 1 faces the user. For example, the display unit for vehicle 100 may be attached to the central part of an instrument panel in a vehicle width direction.

Note that as shown in FIG. 1 and FIG. 3, the display unit for vehicle 100 has an approximately rectangular shape. The display unit for vehicle 100 is attached to the vehicle such that the longer side direction of the touch panel and a display surface 2A of the LCD module 2 corresponds to the vehicle width direction.

Further, the shape and the area of the front part of the display unit for vehicle 100 is approximately the same as those of the display surface 2A of the LCD module 2. Note that the range of the "approximately the same" is determined in accordance with thickness and support structure of the housing. As an example, as the outer dimension of the display unit for vehicle 100, the length in the longer side direction (i.e., the width) is 200 mm; the length in the shorter side direction (i.e., the height) is 132 mm; and the depth is 40 mm. In the substrate 4 accommodated in the unit, the length in the longer side direction is equal to or shorter than 200 mm; and the length in the shorter side direction is equal to or shorter than 132 mm.

Hereinafter, in the explanation of the respective elements, the direction from the touch panel 1 toward the housing rear surface 61 will be referred to as a front direction; the right side of each element viewed from the front direction, front direction right side; and the left side, front direction left side. Further, the upper side/lower side used upon explanation of positional relationship corresponds to the upper side/lower side in a status where the display unit for vehicle 100 is installed in the vehicle.

The touch panel 1 is e.g. a capacitive touch panel and it is laminated on the display surface 2A of the LCD module 2. Note that the touch panel 1, which is a capacitive touch panel, may be a touch panel to detect a user's touch position with another method (e.g. a pressure sensitive type touch panel).

The touch panel 1 is electrically connected to a touch panel controller 55 to be described later via a flexible cable (TP control cable). The touch panel 1 successively outputs a signal indicating whether or not the touch panel 1 is touched by the user, and when the touch panel is touched, outputs a signal to specify the touch position, to the touch panel controller 55. In the present embodiment, as an example, the TP control cable is extended from the end of the front direction right side of the lower edge of the touch panel 1. The position in which the TP control cable is extended from the touch panel 1 is not limited to this position.

Figure 4:
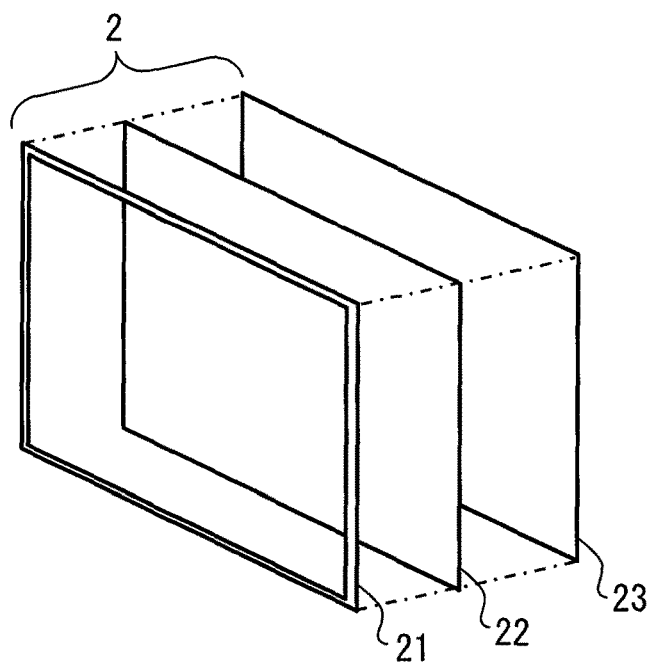
FIG. 4 is an exploded perspective view of an LCD module.

The LCD module 2 is a display having the display surface 2A to display various types of information. As shown in FIG. 4, in the LCD module 2, an LCD cover 21 to protect a TFT glass cell 22, the TFT glass cell 22 including a color filter and a TFT substrate, and a backlight 23 as a light source, are sequentially laminated and integrated.

In the LCD module 2, a flexible cable (LCD cable) to input a control signal to a data driver and a gate driver is extended in the vicinity of a central part at the lower edge of the rear surface. The other end of the LCD cable is electrically connected to a display controller 50 via a display connector 49 to be described later.

The LCD module 2 displays desired information by driving liquid crystal and controlling light transmittance from the backlight by pixel based on the control signal from the display controller 50.

Note that in the backlight 23, a flexible cable (light source cable) to input a control signal to control output light amount is extended at a lower edge. The other end of the light source cable is electrically connected to a main CPU 45 via a backlight connector 53 provided on the a substrate 4.

The plate 3 is a conductive plate member having an approximately square shape. The plate plays a role in supporting the substrate 4. Further, the plate protects the LCD module 2 from an electromagnetic wave caused from the substrate 4, and reduces possibility of leakage of the electromagnetic wave to the outside of the display unit for vehicle 100. Further, the plate plays a role in protecting the substrate 4 from the extraneous electromagnetic wave.

Figure 5:
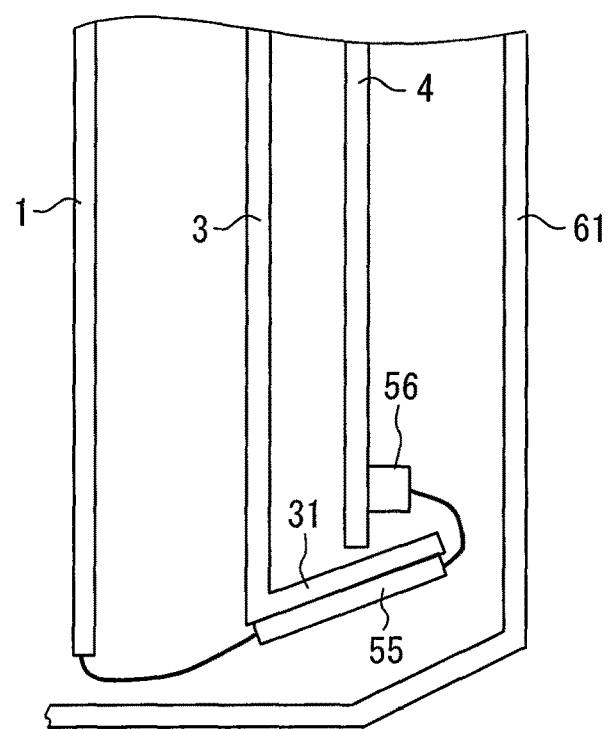
FIG. 5 is a conceptual diagram for explaining positional relationship among a base section of a plate, a substrate, and a housing rear surface.

The plate 3 has the base section 31 for installation of the touch panel controller 55, extended at a predetermined angle in the direction of the housing rear surface 61, at a lower right corner in the front direction. Here, as an example, as shown in FIG. 5, the base section 31 is provided at a predetermined angle in a vertical direction with respect to a plane part of the plate 3.

Note that the base section 31 may be provided at any angle as long as it is not in contact with the substrate 4 and the touch panel controller 55 provided on the lower side of the base section 31 is not in contact with a the housing rear surface 61. For example, the base section 31 may be provided at a right angle with respect to the plane part of the plate 3.

Further, the base section 31 is provided at the lower right corner in the front direction of the plate 3 as an example, however, the installation position is not limited to this position. The base section 31 may be provided in any position as long as it is provided at the edge of the plate 3. For example, the base section 31 may be provided at a left side edge (or right side edge) of the plate 3. However, it is preferable that it is provided in a position relatively close to the position where the TP control cable is extended in the touch panel 1.

The touch panel controller 55 controls the operation of the touch panel 1. The touch panel controller is mutually-communicably connected via the TP control cable to the touch panel 1. Note that the touch panel controller 55 is provided on a lower surface (another surface opposite to the housing) of the base section 31 in consideration of connectivity with the touch panel 1.

The touch panel controller 55 is further mutually-communicably connected via a flexible cable (TP input/output cable) different from the TP control cable to a touch panel connector 56 provided on the substrate 4. The touch panel controller 55 is electrically connected via the touch panel connector 56 to the substrate 4, to provide a touch position signal outputted from the touch panel 1 to the electronic component (e.g. the main CPU) provided on the substrate 4.

Figure 6:
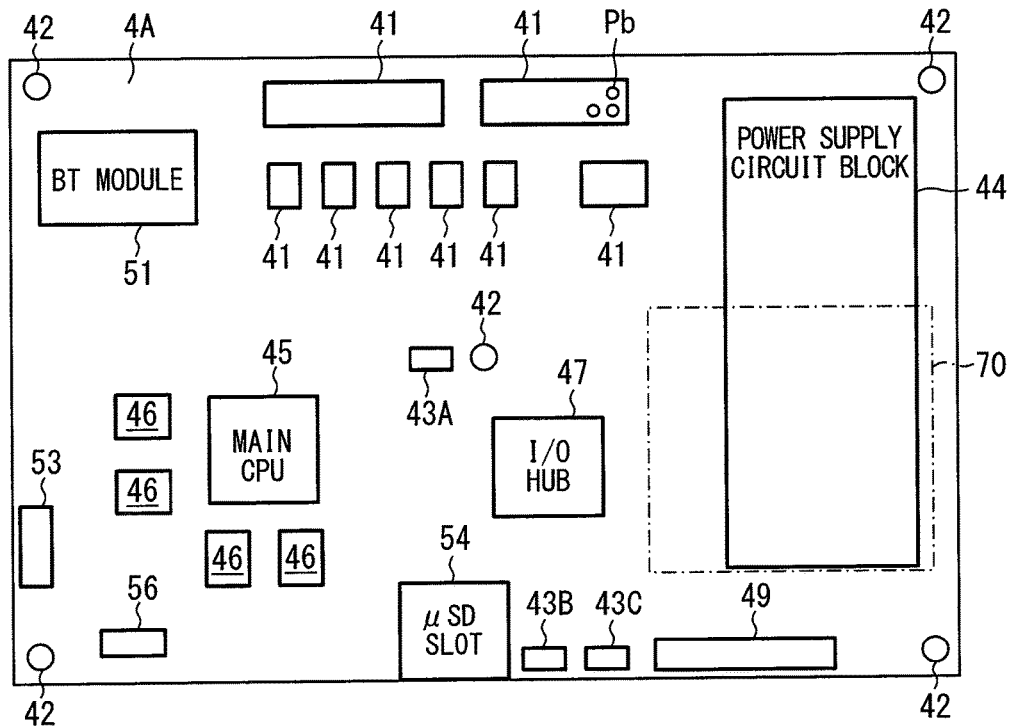
FIG. 6 is a block diagram for explaining arrangement of principal electronic components in a component surface of the substrate.
Figure 7:
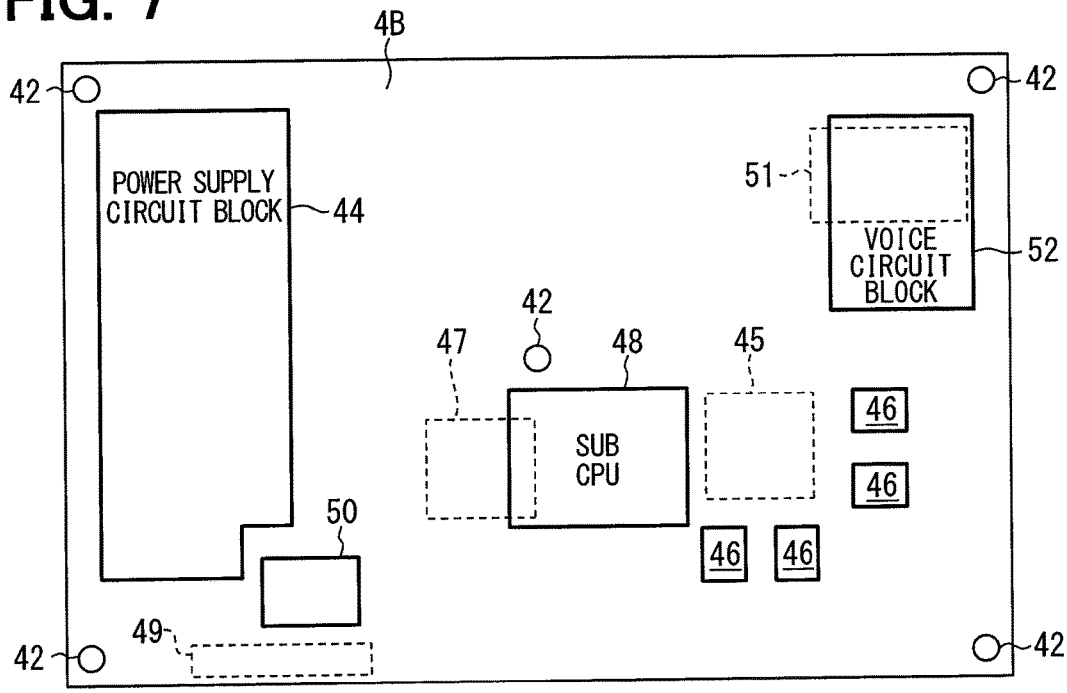
FIG. 7 is a block diagram for explaining the arrangement of the principal electronic components in a solder surface of the substrate.

The substrate 4 is a plate member on which various electronic components for functions of the DCU 102 are mounted. The arrangement of the components on the substrate 4 will be described using FIGS. 6 and 7. FIG. 6 shows a surface of the substrate 4 opposite to the housing rear surface 61 (component surface 4A). FIG. 7 shows a rear side surface of the component surface 4A, i.e., a surface on the opposite side to the plate 3 (solder surface 4B).

As shown in FIG. 6, the substrate 4 has a plurality of vehicle connectors 41, on-board contacts 43A to 43C, a power supply circuit block 44, the main CPU 45, a memory 46, an input/output circuit block 47, the display connector 49, a BT module 51, the backlight connector 53, a micro SD car (hereinafter, •SD card) slot 54, and the touch panel connector 56, on the component surface 4A.

Further, as shown in FIG. 7, the substrate 4 has the power supply circuit block 44, the memory 46, a sub CPU 48, the display controller 50, and a voice circuit block 52 on the solder surface 4B. Note that among the components mounted on the component surface 4A, regarding the components mounted on the solder surface 4B, the positions of the components are indicated with a broken line in FIG. 7.

A large number of devices other than the components described here are mounted in high-density packaging on the both component surface 4A of the solder surface 4B of the substrate 4. The electronic components described here are primary components having comparatively large occupation areas among the electronic components provided in the respective surfaces of the substrate 4.

The vehicle connectors 41 are connectors to electrically connect the various electronic devices mounted on the vehicle and the vehicle power source to the substrate 4. The vehicle connectors 41 correspond to the external connectors. The on-board contacts 43A to 43C are members for mechanical contact with the housing rear surface 61, and electrical connection between the substrate 4 and the housing rear surface 61. The power supply circuit block 44 is a circuit to generate voltage to be supplied to the respective parts of the display unit for vehicle 100. The power supply circuit block 44 converts voltage supplied from the vehicle power source into operation voltage for the respective parts and outputs the converted voltage.

The main CPU 45 generates display data to be displayed on the LCD module 2 based on information acquired from a connected device, and outputs the display data to the display controller 50 to be described later. The display data corresponds to image data. Further, the main CPU 45 controls the operation of the connected device by executing a predetermined application program. The memory 46 is a well-known memory used in operation with the main CPU 45 and the sub CPU 48.

The input/output circuit block 47 is a circuit for the main CPU 45 sub CPU 48 to perform signal input/output via the vehicle connectors 41 to/from the outside of the display unit for vehicle 100. The sub CPU 48 ON/OFF controls the power source of the display unit for vehicle 100 in cooperation with the power supply circuit block 44. Further, the sub CPU 48 manages (acquires and stores) vehicle information inputted from the vehicle, and sequentially supplies the information to the main CPU 45. That is, the sub CPU 48 performs processing corresponding to the operating system in the DCU 102.

The display connector 49 is a connector for electrical connection to a connection terminal of the LCD cable. The display connector 49 is also electrically connected to the display controller 50. That is, the display connector 49, connected to the LCD cable, electrically connects the LCD module 2 to the display controller 50.

The display controller 50 is electrically connected to the display connector 49 and the main CPU 45 respectively. The display controller 50 generates a control signal based on the display data inputted from the main CPU 45 and outputs the signal to the display connector 49, to drive a data driver and a gate driver of the LCD module 2. That is, the display controller 50 controls driving of the LCD module 2.

The BT module 51 is a radio communication module to perform radio communication in conformity with the Bluetooth (registered trademark) standards. The BT module 51 is electrically connected to the voice circuit block 52 and a Bluetooth communication antenna (hereinafter, BT antenna) provided outside the substrate 4, respectively. Note that in the present embodiment, the BT module 51 is a radio communication module corresponding to Bluetooth communication. The BT module may be a radio communication module in conformity with other well-known near field radio communication standards.

The BT antenna is provided, e.g., an upper right corner in the front direction in the housing. That is, viewed from a direction facing the component surface 4A, the BT antenna is provided in an upper left position on the component surface 4A in the housing. The BT antenna may be provided outside the housing.

The voice circuit block 52 is electrically connected to the BT module 51 and the main CPU 45. The voice circuit block converts a voice signal inputted from the main CPU 45 into a signal of a predetermined signal format, and outputs the signal to the BT module 51. Further, the voice circuit block converts the audio signal inputted from the BT module 51 into data in a format handled with the main CPU 45, and outputs the data to the main CPU 45.

The backlight connector 53 is a connector connected to a connection terminal of a light source cable. The backlight 23 is connected via the backlight connector 53 to the substrate 4. The main CPU 45 or the sub CPU 48 controls the amount of output light of the backlight.

The •SD card slot 54 is a slot in which a well-known •SD card is inserted. When a •SD card is inserted in the •SD card slot 54, it is possible for the main CPU 45 and the sub CPU 48 to write, read, delete, and move data to/from the •SD card. The •SD card slot 54 corresponds to a memory slot.

The touch panel connector 56 is a connector connected to a connection terminal of the TP input/output cable. The touch panel controller 55 provided on the base section 31 of the plate 3 is connected to the substrate 4 in the touch panel connector 56, to perform mutual communication with the main CPU 45 and the sub CPU 48. Further, a screw hole 42 provided at the respective corners and a central part of the substrate 4 is a hole through which a screw to fix the substrate 4 to the plate 3 and the housing rear surface 61 is inserted.

Prior to description of the detailed positional relationship among the respective electronic components in the respective surfaces of the substrate 4, requirements for arranging the various electronic components on the substrate 4 will be described.

First, one object is, in the DCU 102 according to the present embodiment, upon realization of the functions of the conventional DCU by using one substrate 4 in place of using two substrates in the conventional DCU, to suppress the increment of substrate area in comparison with the substrate area used in the conventional DCU.

Especially from the viewpoint of mountability on the vehicle, it is preferable that the area of the substrate 4 is equivalent to that of the conventionally used substrate, i.e., the area of the substrate is smaller than the area of the LCD module 2. In the present embodiment, by combining introduction of component arrangement to be described later and the base section 31, and downsizing of the components, it is possible to realize one substrate 4, using the substrate 4 which is smaller than the LCD module 2.

Note that as representative functions of the conventional DCU, Bluetooth communication and voice processing function are known other than drive control of the touch panel and the display, cooperation control of connected devices, generation of display data, management of power source, acquisition of vehicle information. Further, the conventional DCU has an insertion slot for removable storage medium such as a SD card.

It is also necessary for the DCU 102 according to the present embodiment to have at least the above functions of the conventional DCU (functional requirements). In the present embodiment, the DCU has the touch panel controller 55 and the display controller 50 corresponding to the drive control of the touch panel and the display. Further, the main CPU 45 performs cooperation control of connected devices and generation of display data. The power supply circuit block 44 and the sub CPU 48 in cooperation perform management of power source.

Further, in the present embodiment, the Bluetooth communication is realized by providing the BT module 51. The voice circuit block 52 is provided in correspondence with the voice processing function. Further, the •SD card slot 54 is provided in correspondence with the SD card insertion slot.

That is, the DCU 102 according to the present embodiment fulfills the above functional requirements. Note that the sub CPU 48 according to the present embodiment has a CAN wake-up function not provided in the conventional DCU. The CAN wake-up function is starting the display unit for vehicle 100 when vehicle information indicating opening of a vehicle door is inputted.

Further, in the point of heat dissipation in the housing, it is necessary that the DCU 102 has heat dissipation equivalent to or improved in comparison with the conventional DCU (heat dissipation requirement). Further, when a primary IC mounted on the substrate 4 is changed, it is necessary to change software of the own device and connected devices in some cases. Accordingly, from the viewpoint of simple change from the conventional DCU to the DCU 102, it is preferable to avoid replacement of components accompanied by software change (software requirement).

Further, to change the conventional DCU, it is necessary to realize an EMC performance equivalent to or higher in comparison with the conventional DCU (EMC requirement).

Further, when the DCU 102 is mounted on a vehicle as a display unit for vehicle 100, it is connected to various electronic devices. Generally, in the space of a vehicle for mounting the display unit for vehicle 100, the positions in which the cables for connection to the display unit for vehicle 100 are extended are designed with a vehicle manufacturer. That is, it is difficult for the manufacturer of the display unit for vehicle 100 to change the positions in which the cables are extended in the vehicle. Accordingly, it is necessary that in the display unit for vehicle 100, the vehicle connectors 41 are provided in the same positions in the conventional DCU (vehicle requirement).

Further, it is also preferable that simple assembly upon manufacturing is equivalent to or improved in comparison with the conventional DCU. The simple assembly here is reduction of screw-fixed positions (assembly requirement).

Next, determination of arrangement of the respective electronic components on the substrate 4 so as to reduce the area of the substrate 4 to an area smaller than the area of the LCD module 2 while fulfill the above various requirements will be described.

First, based on the vehicle requirement, the vehicle connectors 41 are provided in predetermined positions of the component surface 4A. Here the positions where the cables from the respective connected devices are extended on the vehicle side correspond to an upper end of the central part in the width direction of the housing rear surface 61 (including neighboring part). Accordingly, the plurality of vehicle connectors 41 are provided in the vicinity of the center of the upper end of the component surface 4A.

More particularly, the plurality of vehicle connectors 41 are arrayed in two rows in the longer side direction (i.e. crosswise direction) in the vicinity of the center of the upper end of the component surface 4A. The upper end here is an upper range from the center of the substrate 4.

Next, from the viewpoint of the EMC requirement and vibration resistance, the positions of the screw holes 42 and fixing of the substrate 4 in the housing are determined. In the present embodiment, the screw hole 42 is provided at the four corners of the substrate 4, and the housing rear surface 61, the substrate 4, and the plate 3 are fastened in the respective screw holes 42. The actual screw fixing is the operation at the assembly step after the completion of arrangement of all the components.

In the substrate 4, fastened with the housing rear surface 61 and the plate 3, mechanical stability is enhanced, and further, electrical connection among the substrate 4, the housing rear surface 61 and the plate 3 is increased, thus the ground (reference potential) stability is enhanced. Accordingly, the EMC performance is improved. Note that here the housing including the housing rear surface 61 is used as the ground.

In the central part of the substrate 4, as in the case of the four corners, it is preferable from the viewpoint of the ground stability (i.e. the EMC requirement) that the substrate is fastened with the housing rear surface 61 and the plate 3. However, to perform fastening, the mounting area of the electronic components in the substrate 4 is reduced for the area of contact between the plate 3 or the housing rear surface 61 and the substrate 4. Accordingly, in the screw hole provided at the center of the substrate, the substrate 4 is not fastened but screw fixed to the plate 3.

The on-board contact 43A is provided in the vicinity of the screw hole 42 provided in the central part of the substrate, to be in contact with the housing rear surface 61. That is, in the central part of the substrate, the substrate 4 is fixed to the plate 3 with a screw. Further, the interval between the housing rear surface 61 and the substrate 4 is ensured and the housing rear surface and the substrate are electrically connected with the on-board contact 43A. With this configuration, it is possible to ensure the mounting area and freedom of pattern wiring while improve noise resistance and vibration resistance.

Next, the position of the power supply circuit block 44 is determined based on the positions of a pin (power supply pin) Pb connected to the vehicle power source (e.g. on-vehicle battery) among the pins of the vehicle connectors 41, the screw hole 42, and the on-board contact 43A. The power supply circuit block 44 or the wiring connecting the power supply pin Pb to the power supply circuit block 44 often becomes a noise source. Accordingly, it is necessary to arrange the power supply circuit block 44 in the vicinity of the power supply pin Pb and in the vicinity of a device which plays a role to by-pass noise caused from the power supply circuit block 44 to the housing such as the screw hole 42 or the on-board contact 43A.

As shown in FIG. 6, in the present embodiment, the power supply pin Pb is provided at the right end of the upper right vehicle connector 41, among the plurality of vehicle connectors 41. Accordingly, the power supply circuit block 44 is provided at the right side end of the component surface 4A and its rear side. The rear side of the right side end of the component surface 4A corresponds to the left side end of the solder surface 4B.

The right side end of the component surface 4A here is a range on the right side from the power supply pin Pb in the component surface 4A. Note that the power supply circuit block 44 may be provided in any position as long as it is positioned in a region relatively close to the power supply pin Pb at least in one of the component surface 4A and the solder surface 4B. For example, when the position of the power supply pin Pb is relatively on the right side of the component surface 4A as in the case of the present embodiment, the power supply circuit block 44 may be provided in respectively arbitrary positions in a region on the right side from the center of the component surface and in a region on the left side from the center of the solder surface 4B.

It is preferable that the main CPU 45 and the sub CPU 48 are provided in the vicinity of the center for connection to the other electronic components. Further, it is necessary to provide the memory 46 and the input/output circuit block 47 in the vicinity of the main CPU 45 and the sub CPU 48.

In the present embodiment, as an example, the main CPU 45 and the input/output circuit block 47 are provided in the central part of the component surface 4A. Four memories 46 are provided on the periphery of the main CPU 45 and other four memories 46 are provided on the rear side of the part. Further, the sub CPU 48 is provided in the central part of the solder surface 4B.

Next, the positions of the display connector 49 and the display controller 50 are determined. As described above, the LCD cable is extended in the vicinity of the center of the lower edge of the LCD module 2. Accordingly, it is preferable that the display connector 49 connected to the LCD cable is provided at the lower end of the substrate 4.

Here, as an example, the display connector 49 is provided in a position slightly right side from the center at the lower end of the component surface 4A. Note that the display connector 49 is downsized in comparison with a display connector in the conventional DCU.

Further, it is preferable that the display controller 50 is provided in the vicinity of the display connector 49. Accordingly, the display controller 50 is provided in the vicinity of a position in the solder surface 4B corresponding to the rear side of the display connector 49, i.e., in a position slightly on the right side from the center at the lower end of the solder surface 4B.

It is preferable that the installation position of the BT module 51 is close to the installation position of the BT antenna. Here the BT antenna is provided at an upper right corner in the front direction in the housing. Accordingly, the BT module 51 is provided at an upper left corner of the component surface 4A. The upper left corner is a range within a predetermined distance (e.g. 40 mm) from the upper left corner.

Further, it is preferable that the voice circuit block 52 connected to the BT module 51 is provided in a position close to the BT module 51. Accordingly, the voice circuit block 52 is provided in the vicinity of an upper right corner of the solder surface 4B, i.e., on the rear side of the BT module 51.

It is necessary to provide the •SD card slot 54 in a position close to the main CPU 45 since the •SD card slot is accessed with the main CPU 45. Accordingly, in the present embodiment, as an example, the •SD card slot 54 is provided in the vicinity of the center of the lower end of the component surface 4A. Note that in the conventional DCU, an SD memory card is employed as a removable storage medium. Here the SD memory card is changed to a •SD card, to reduce the mounting area while fulfill the functional requirement.

Note that there is a possibility that, by employing the •SD card as a removable storage medium, noise caused from the •SD card slot increases in comparison with a case where the SD card is employed as a removable storage medium. Accordingly, the two on-board contacts 43B and 43C are provided in the vicinity of the •SD card slot 54. The on-board contacts 43B and 43C mainly play a role to by-pass the noise caused in the •SD card slot 54 to the housing rear surface 61. With this configuration, it is possible to maintain or improve the EMC performance. Note that in the present embodiment, the two on-board contacts are provided adjacently to the •SD card slot 54, however, the number of the on-board contacts is not limited as long as at least one on-board contact is provided.

It is preferable that the backlight connector 53 is provided at the edge of the substrate 4 for connection to the light source cable. The lower end of the substrate 4 is occupied with the above display connector 49, the display controller 50, the •SD card slot 54, and electronic components accompanying these components (not shown), and has no sufficient space for the backlight connector 53. Accordingly, the backlight connector 53 is provided in a position on the lower side at the left side edge of the component surface 4A.

As described above, the touch panel connector 56 is connected via the TP input/output cable to the touch panel controller 55, accordingly, it is preferable that the touch panel connector is provided in the vicinity of the base section 31 on which the touch panel controller 55 is provided. In the present embodiment, the base section 31 is provided at a lower right corner in the front direction of the plate 3. Accordingly, the touch panel connector 56 is provided in the vicinity of a lower left corner of the component surface 4A.

As described above, by providing the primary electronic components, further, with IC downsizing, selection of lower surface electrode inductor parts, and by high-density packaging, it is possible to realize functions equivalent to or higher in comparison with the conventional DCU by using the substrate 4 smaller than the LCD module 2. Note that upon downsizing of the IC, an IC compatible with an IC used in the conventional DCU is employed so as not to cause software change. Further, a primary IC is not changed. With this configuration, the software requirement is satisfied.

According to the above configuration, as the number of the substrates 4 in the display unit for vehicle 100 is reduced from two to one, the space in the housing is not partitioned with a plurality of substrates. That is, the heat dissipation of the DCU 102 (eventually the display unit for vehicle 100) is improved.

Further, since two substrates are used in the conventional DCU, the space for accommodation of a cooling fan is not ensured in the housing of the DCU 102. The fan is installed outside the housing.

However, in the present embodiment, since only one substrate 4 is used, it is possible to accommodate the cooling fan 70 in the housing of the DCU 102. For example, as shown in FIG. 6, the fan 70 is provided in a position opposite to the power supply circuit block 44 in a surface of the housing rear surface 61 opposite to the substrate 4. The reason for the arrangement is that the power supply circuit block 44 is the most heat-generating component among the components provided on the substrate 4.

The arrangement of the fan 70 inside the housing means arrangement of the fan in a position closer to the heat source in comparison with the configuration where the fan is provided outside the housing. That is, according to the configuration of the present embodiment, it is possible to further improve the heat dissipation by providing the fan 70 in a position closer to the heat source in comparison with the conventional DCU.

Further, by accommodating the fan 70 in the housing, it is possible to reduce the amount of leakage of noise caused from the fan 70 to the outside of the housing. Accordingly, it is possible to increase the number of revolutions of the fan 70 and further improve the heat dissipation in comparison with the conventional DCU.

Further, since the number of the substrates 4 in the display unit for vehicle 100 is reduced from two to one, it is possible to reduce the number of steps required for assembly. Further, it is possible to reduce the parts cost and suppress the manufacturing cost. Further, since the number of substrates to be fixed to the housing is reduced to the half, it is possible to reduce the number of positions to be finally screw-fixed.

That is, it is possible to improve simple assembly in comparison with the conventional DCU.

As described above, the embodiment of the present disclosure has been explained, however, the present disclosure is not limited to the above embodiment. The following embodiment is included in the technical range of the present disclosure. Further, in addition to the following embodiment, the present disclosure may be implemented in various modifications within a range not departing from the subject matter.

For example, the positions of the main CPU 45 and the sub CPU 48 may be exchanged. Further, the positions of the display connector 49 and the display controller 50 may be arbitrarily changed within a range to route the LCD cable. Note that it is preferable that the components are provided at an edge of the substrate 4. The position of the backlight connector 53 is not limited to the left side edge of the component surface 4A but in any part as long as it is provided at the edge of the substrate 4.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display unit for a vehicle comprising:
   a display having a display surface with a rectangular shape;
   a touch panel stacked on the display surface;
   a substrate with a rectangular shape, on which a main CPU that generates image data to be displayed on the display, a sub CPU that controls electric power supply in the display unit, a display controller that performs a drive control on the display based on the image data, and a plurality of external connectors used for electrical connection to at least one external device arranged outside the display unit, are mounted;
   a plate that is a conductive plate member, and supports the substrate; and
   a housing that accommodates the display, the plate, and the substrate so as to expose the display surface of the display,
   the display unit for the vehicle mutually and communicably connected to the at least one external device and controlling a content to be displayed on the display based on a request from the at least one external device, wherein:
   the plate is arranged on an opposite side to the display surface so as to face the display;
   the substrate is arranged on an opposite side to the display with respect to the plate so as to face the plate;
   the plate has a base extending to a direction of the substrate with a predetermined angle and disposed on an edge of the plate;
   a touch panel controller for controlling a drive of the touch panel is arranged on the base; and
   the substrate further includes a touch panel connector used for electrical connection between the touch panel controller and the substrate.

2. The display unit for vehicle according to claim 1, wherein:
   the substrate has a component surface, on which the plurality of external connectors and the main CPU are disposed, as a surface opposite to a housing rear surface of the housing positioned on a rear side of the display surface;
   the substrate has a solder surface, on which the sub CPU is disposed, as a rear surface opposite to the component surface and facing the plate;
   the plurality of external connectors are arranged on a position of the component surface corresponding to a position of the vehicle, at which a cable for electrically connecting to the display unit extends from the at least one external device;
   one of the plurality of external connectors has a power supply pin for connecting to a vehicle power source; and
   the substrate further includes a power source circuit which is disposed on the component surface in a vicinity of the power supply pin, is connected to the power supply pin, and generates a voltage to be supplied to each element of the display unit.

3. The display unit for vehicle according to claim 2, wherein:
   the plurality of external connectors are arranged along a right-left direction on an upper end of the component surface, which is positioned in an upper position in a case where the display unit for the vehicle is installed in the vehicle;
   the power supply pin is arranged in one of the plurality of external connectors positioned at a right end of the plurality of external connectors; and
   the power source circuit is arranged on a right end side of the component surface viewed from the plurality of external connectors.

4. The display unit for vehicle according to claim 3, wherein:
   the substrate further includes a display connector that is disposed on a lower end of the component surface, is electrically connected to a cable extending from an edge of the display to a rear surface side of the display, and electrically connects between the display and the display controller; and
   the display controller is arranged on a position of the solder surface corresponding to the rear side of the display connector.

5. The display unit for vehicle according to claim 3, further comprising:
   an antenna that executes a short range wireless communication, and is disposed in the housing, wherein:
   the substrate further includes a radio communication module that is electrically connected to the antenna, performs a processing for executing the short range wireless communication, and disposed on a position of the component surface close to the antenna; and
   the substrate further includes a voice circuit that processes a voice signal input into and output from the radio communication module, and disposed on a position of the solder surface corresponding to the rear side of the radio communication module.

6. The display unit for vehicle according to claim 3, wherein:
   the substrate further includes a memory slot, into which a removable storage medium is inserted, disposed on a lower end of the component surface; and
   the substrate further includes at least one on-board contact that mechanically contacts the housing rear surface, electrically connects between the substrate and the housing rear surface, and is disposed adjacent to the memory slot.

7. The display unit for vehicle according to claim 3, wherein:
  the substrate is fastened to the housing rear surface and the plate with a screw at four corners of the substrate;
  the substrate is fixed to the plate with another screw at a center of the substrate; and
  the substrate further includes an on-board contact that is mechanically contacts the housing rear surface, electrically connects between the substrate and the housing rear surface, and is disposed on the center of the component surface.

8. The display unit for vehicle according to claim 2, wherein:
  an area of the substrate is smaller than an area of the display.

9. The display unit for vehicle according to claim 2, further comprising:
  a fan that cools the substrate, and is disposed on a surface of the housing opposed to the component surface.

10. A display control unit connected to a user interface unit which includes: a display having a display surface with a rectangular shape; and a touch panel stacked on the display surface, mutually and communicably connected to at least one external device which is disposed outside the display control unit, and controlling a content to be displayed on the display based on a request from the at least one external device, the display control unit comprising:
  a substrate with a rectangular shape, on which a main CPU that generates image data to be displayed on the display, a sub CPU that controls an electric power supply status in the display control unit, a display controller that performs a drive control on the display based on the image data, and a plurality of external connectors used for electrical connection to at least one external, are mounted; and
  a plate that is a conductive plate member, and supports the substrate, wherein:
  the substrate is arranged to face the plate with a predetermined distance;
  the plate has a base extending to a direction toward the substrate with a predetermined angle, and disposed on an edge of the plate;
  a touch panel controller for controlling a drive of the touch panel is arranged on the base; and
  the substrate further includes a touch panel connector used for electrical connecting between the touch panel controller and the substrate.

* * * * *